F. B. TOWNSEND.
WIRE HANDLE AND COVER FASTENER FOR GRAPE BASKETS, &c.
APPLICATION FILED MAR. 31, 1914.
1,125,212.
Patented Jan. 19, 1915.
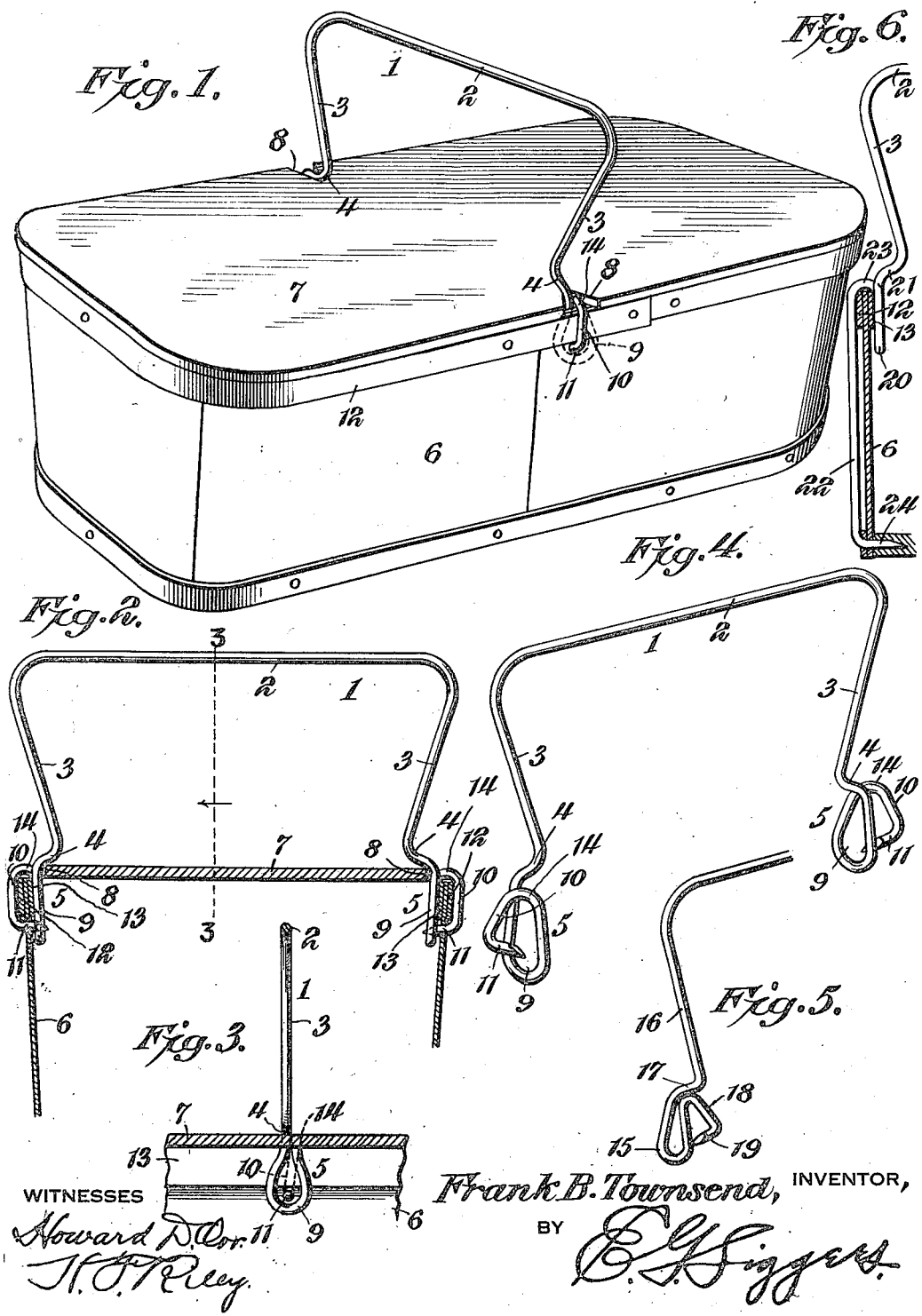

UNITED STATES PATENT OFFICE.

FRANK B. TOWNSEND, OF PENN YAN, NEW YORK, ASSIGNOR OF ONE-HALF TO JOHN E. McMATH, OF PENN YAN, NEW YORK.

WIRE HANDLE AND COVER-FASTENER FOR GRAPE-BASKETS, &c.

1,125,212.  Specification of Letters Patent.  Patented Jan. 19, 1915.

Application filed March 31, 1914. Serial No. 828,641.

*To all whom it may concern:*

Be it known that I, FRANK B. TOWNSEND, a citizen of the United States, residing at Penn Yan, in the county of Yates and State of New York, have invented a new and useful Wire Handle and Cover-Fastener for Grape-Baskets, &c., of which the following is a specification.

The invention relates to improvements in wire handles and cover fasteners for grape baskets and analogous receptacles.

The object of the present invention is to improve the construction of wire handles for grape baskets and to provide a simple, strong, and inexpensive wire handle adapted to be easily and rapidly applied to a basket without hooking it through the same beneath the upper reinforcing strips or hoops, and capable of completely embracing the top hoops whereby it is securely fastened to the basket and is effectually prevented from becoming disengaged therefrom by an accidental blow upon the top of the handle.

A further object of the invention is to provide a wire handle of this character, capable of engaging the cover of a basket and firmly and securely holding said cover flat against the upper edges of the basket.
The invention also has for its object to provide a wire handle which will not have to be sprung inwardly prior to placing the cover in position, in order to secure the necessary clamping action thereon, whereby the baskets will be of a uniform size to provide tight package and to eliminate the objectionable feature of spreading the basket to apply the cover thereof and leaving the contents in a loose condition after the cover has been applied.

With these and other objects in view the invention consists in the construction and novel combination of parts hereinafter fully described, illustrated in the accompanying drawings, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is a perspective view of a grape basket constructed in accordance with this invention. Fig. 2 is a transverse sectional view of the same. Fig. 3 is a detail sectional view on the line 3—3 of Fig. 2. Fig. 4 is a perspective view of the handle detached. Fig. 5 is a perspective view of one side of a handle, illustrating another form of the invention. Fig. 6 is a vertical sectional view of one side of a basket provided with a wire handle illustrating still another form of the invention.

Like numerals of reference designate corresponding parts in all the figures of the drawings.

In Figs. 1 to 4 inclusive of the accompanying drawing, in which is illustrated the preferred embodiment of the invention, 1 designates a wire handle formed from a single piece of stout wire or other suitable material and consisting of a straight transverse grip portion 2 and sides 3 extending downwardly and inwardly at an inclination and bent laterally to form inclined cover engaging shoulders 4. The terminals of the wire are then bent to form clamps 5 for securing the handle to the sides of a grape basket 6 or other receptacle. The inclined shoulders 4 extend upwardly and inwardly over the cover 7, which is held flat against the upper edges of the basket. The cover is provided at opposite sides with centrally arranged approximately U-shaped notches or recesses 8, which are adapted to straddle the side portions of the wire handle, and which also enable the cover to be placed in position with a slight outward springing of the handle. The handle is sprung outward as the cover passes the lateral bends of the sides, and the said handle regains its former position as soon as the cover is placed in position beneath the inclined shoulders 4, which hold the cover tightly against the upper edges of a basket. By this construction it is unnecessary to compress or bend the handle inwardly prior to placing the cover in position in order to secure the necessary clamping action for holding the cover firmly in place. Each clamp is composed of an upwardly tapered loop 9 and a centrally arranged coacting arm or jaw 10 having a terminal prong 11 bent approximately at right angles and disposed transversely of the basket, and adapted, when pressure is applied to the clamp, to pierce the side of the basket below the upper hoops and project into the loop, as clearly shown in Fig. 2 of the drawing. The upwardly tapered loop 9 has substantially straight upwardly converging sides and a curved bottom connecting portion. One of the sides is connected with the lateral bend which forms the inclined shoulder 4, and the arm or jaw 10 extends from the other side of the loop. The upward taper of the loop arranges the coacting arm or jaw centrally with relation to the sides of the loop, and the said loop provides a broad bearing and is adapted to prevent the clamp from twisting or tilting on the basket when pressure is applied for forcing the coacting members of the clamp into engagement with the side of the basket. The members of the clamp may be compressed by machine, a pair of pliers, a hammer, or any other suitable means, and when compressed tightly against the interior and exterior of the basket, they completely embrace the upper reinforcing strips or hoops 12 and 13 and securely fasten the handle to the basket, so that there is no liability of the handle becoming detached from the basket by an accidental blow upon the top of the handle. In practice, the wire handle will be shaped by a wire bending machine or other suitable means and the arm or jaw will be set at an angle to the loop to arrange the terminal prong clear of the loop, so that the handle may be placed in position on the sides of a basket by a single movement, without hooking it through the basket or beneath the reinforcing strips or hoops. This will enable the handle to be applied to the baskets more rapidly than where it is necessary to hook the attaching portions through the basket, or where more than one movement is necessary to arrange the engaging portions of a handle in position to be operated on by the pressure applying means. The end of the prong 11 is arranged to enable it to readily pierce the side of the basket, and the side or jaw is connected with the loop by a top bend 14 which rests upon the upper edge of the basket.

Instead of arranging the loop interiorly of the basket, the wire handle may be provided with an exterior loop 15, as shown in Fig. 5 of the drawing. In this form of the invention the wire at the lower terminal of the side 16 is bent outwardly substantially at right angles to form a shoulder 17, which rests upon the upper edge of the basket. The wire is then bent to form the loop 15, and the coacting side or jaw 18, which is provided with a terminal prong 19.

In Fig. 6 is illustrated another form of the invention, in which the handle is provided with an interiorly arranged loop 20 of the form heretofore described, connected at one side with a lateral bend 21 of the handle, and at the other side with a centrally arranged coacting side or jaw 22. The side or jaw 22 ing side or jaw 22. The side or jaw 22, which is connected with the loop 20 at the top of a bend 23, is bent inwardly at the lower end to provide a transverse terminal prong 24, which pierces the side of the basket and is embedded in the bottom thereof.

What is claimed is:

1. A handle of the class described comprising a transverse grip portion, downwardly extending inwardly-converging sides provided at their lower ends with bends forming outwardly and downwardly inclined shoulders, and integral clamps including loops connected at one side with the said bends and coacting sides or jaws extending downwardly from the other side of the loops and having transversely disposed inwardly-turned terminal prongs for piercing the basket.

2. A handle of the class described comprising a transverse grip portion, downwardly extending inwardly-converging sides provided at their lower ends with bends forming outwardly and downwardly inclined shoulders, and integral clamps including upwardly tapered loops connected at one side with the said bends and centrally arranged coacting sides or jaws extending downwardly from the other side of the loops and having transversely disposed terminal prongs for piercing the basket.

3. A handle of the class described comprising a transverse grip portion, sides extending downwardly from the transverse grip portion, and integral clamps consisting of loops connected at one side with the sides of the handle and jaws extending downwardly from the tops of the loops and having transversely disposed terminal prongs arranged to pierce the sides of the basket beneath the upper hoops and extending to the loops, whereby the clamps completely embrace the said hoops and the loops and jaws are interlocked.

In testimony that I claim the foregoing as my own, I have hereto affixed my signature in the presence of two witnesses.

FRANK B. TOWNSEND.

Witnesses:
JOHN H. SIGGERS,
EDITH L. BROWN.